United States Patent
Eleftheriadis et al.

(10) Patent No.: US 12,335,866 B2
(45) Date of Patent: Jun. 17, 2025

(54) POWER MANAGEMENT USING RECTIFIER CIRCUITS TN WIRELESS NETWORKS

(71) Applicant: Telefonaktiebolaget LM Ericsson (publ), Stockholm (SE)

(72) Inventors: Lackis Eleftheriadis, Valbo (SE); Konstantinos Vandikas, Solna (SE); Junaid Shaikh, Sundbyberg (SE); Jawwad Ahmed, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 364 days.

(21) Appl. No.: 17/782,631

(22) PCT Filed: Dec. 5, 2019

(86) PCT No.: PCT/EP2019/083791
§ 371 (c)(1),
(2) Date: Jun. 3, 2022

(87) PCT Pub. No.: WO2021/110267
PCT Pub. Date: Jun. 10, 2021

(65) Prior Publication Data
US 2023/0023444 A1    Jan. 26, 2023

(51) Int. Cl.
*H04W 52/02* (2009.01)
(52) U.S. Cl.
CPC ............... *H04W 52/0206* (2013.01)
(58) Field of Classification Search
CPC ......... H04W 52/0206; H04W 52/0216; H04W 4/029; H04W 4/70; H04W 52/0229; H04W 52/0245; H04W 4/44; H04W 84/18; H04L 1/0015; Y02D 30/70
See application file for complete search history.

(56) References Cited

U.S. PATENT DOCUMENTS

| | | | |
|---|---|---|---|
| 2011/0143814 A1 | 6/2011 | Hur | |
| 2012/0078436 A1* | 3/2012 | Patel | G06N 3/08 |
| | | | 700/298 |
| 2013/0231156 A1 | 9/2013 | Fischer | |
| 2014/0330441 A1* | 11/2014 | de Castro | H02J 3/1821 |
| | | | 700/291 |
| 2015/0326011 A1 | 11/2015 | Tajiri | |
| 2017/0214244 A1* | 7/2017 | Dall'Anese | H02J 3/381 |
| 2018/0302804 A1 | 10/2018 | Eleftheriadis et al. | |
| 2019/0268786 A1 | 8/2019 | Fischer | |
| 2021/0120491 A1* | 4/2021 | Gupta | H04L 1/0015 |

FOREIGN PATENT DOCUMENTS

CN    109196933 A    1/2019

OTHER PUBLICATIONS

International Search Report and Written Opinion dated Sep. 4, 2020 in International Application No. PCT/EP2019/083791 (9 pages).

* cited by examiner

*Primary Examiner* — Rushil P. Sampat
(74) *Attorney, Agent, or Firm* — Rothwell, Figg, Ernst & Manbeck, P.C.

(57) ABSTRACT

A network node for handling operation of the network node in a communication network. The network node includes at least one power supply unit and one or more additional power units for supplying power to the network node. The network node is configured to obtain an output from a computational model. The network node is configured to set an output voltage from the at least one power supply unit based on the obtained output.

20 Claims, 13 Drawing Sheets

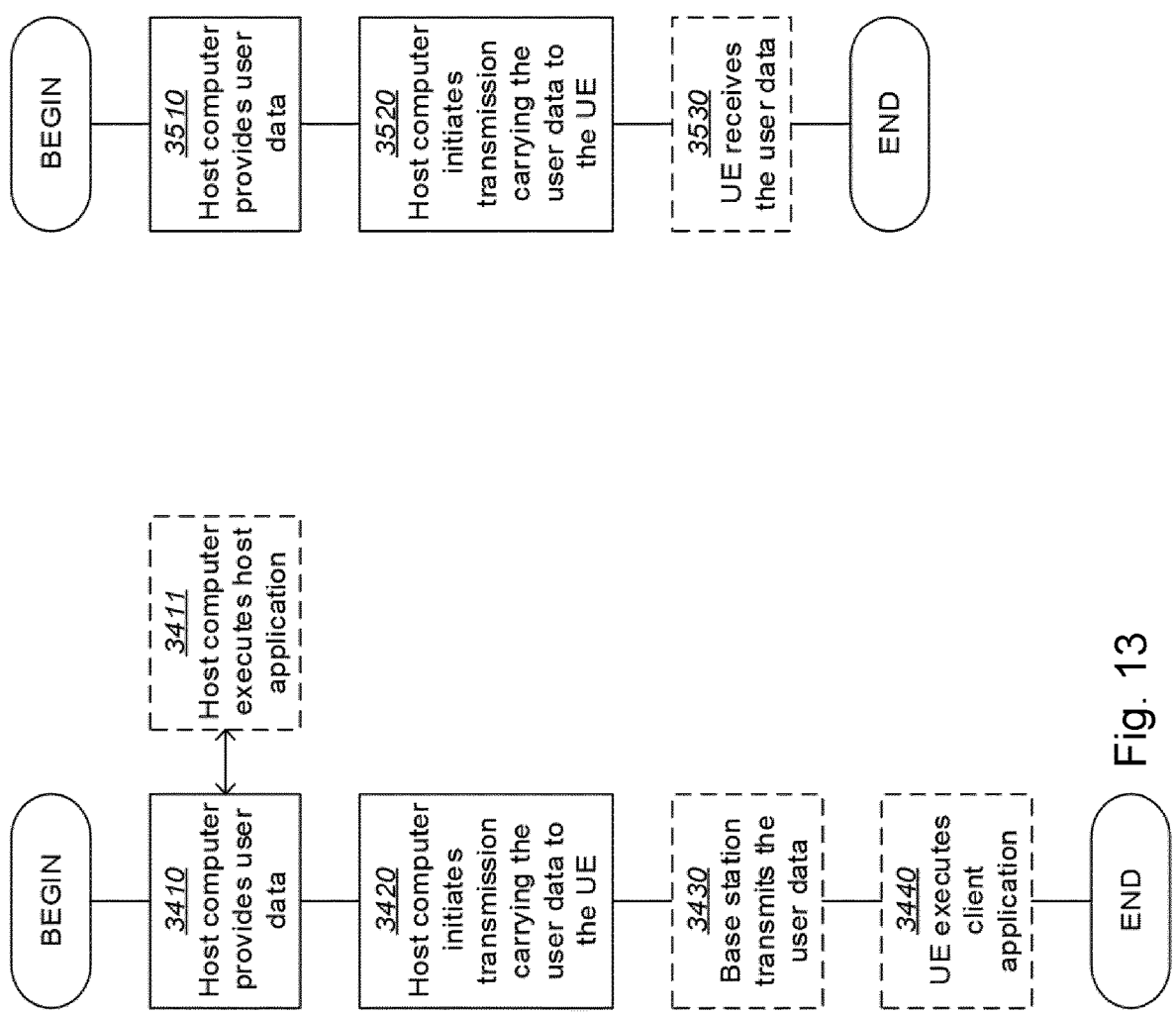

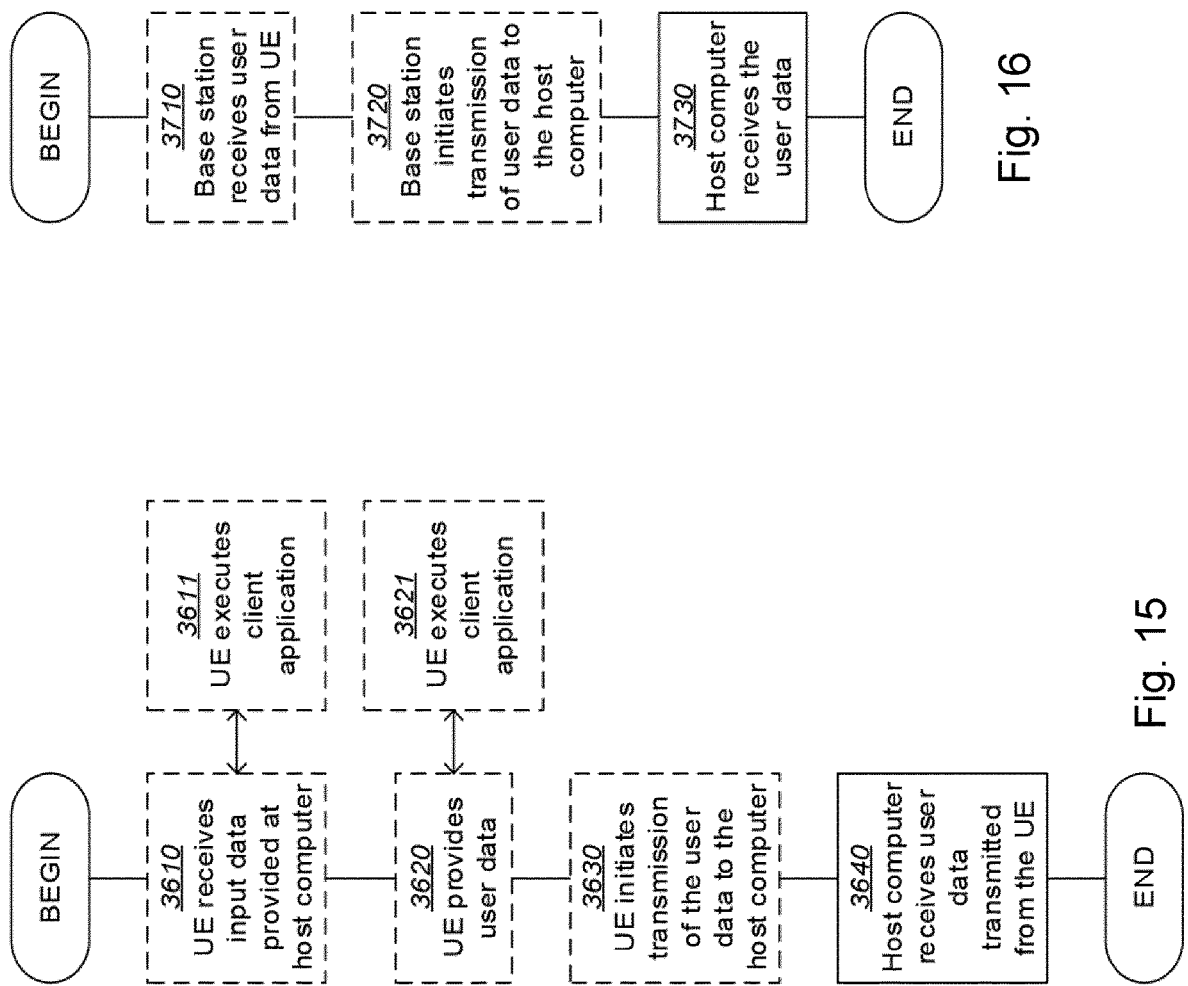

POWER MANAGEMENT USING RECTIFIER CIRCUITS TN WIRELESS NETWORKS

CROSS REFERENCE TO RELATED APPLICATION(S)

This application is a 35 U.S.C. § 371 National Phase Entry Application from PCT/EP2019/083791, filed Dec. 5, 2019, designating the United States, the disclosure of which is incorporated herein by reference in its entirety.

TECHNICAL FIELD

Embodiments herein relate to a network node and method performed therein regarding operation of the network node. Furthermore, a computer program product and a computer-readable storage medium are also provided herein. Especially, embodiments herein relate to handling operation of the network node in a communication network, e.g. selecting and control of voltage during operation or similar.

BACKGROUND

In a typical communication network, UEs, also known as wireless communication devices, mobile stations, stations (STA) and/or wireless devices, communicate e.g. via a Radio access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the access node. The radio network node may be a distributed node comprising a remote radio unit and a separated baseband unit.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies also known as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Network operators are having a need to improve the total cost of ownership (TCO), including Capital Expenditure (CAPEX) and Operating Expenditure (OPEX). One of the important challenges and priorities is to improve the network operating efficiency of the total site and in particular a network node e.g. a radio network node such as a base station.

To be able to add and expand a network node with one or more 5G radio units, the operators need consider the total power consumption and to be able to reduce the total power consumption of each network node at the same time. In other case the total power consumption will increase, when only adding 5G radio units, to existing GSM, WCDMA and LTE network. Thus, a reduction in power demand is needed.

A disadvantage with current deployment of network nodes such as radio network node but also in other areas such as computer servers or similar, is that the power architecture itself is static. The total end to end (e2e) power consumption from alternating current (AC) input to an output unit such as a remote radio unit output, need to be correlated and controlled in respect to energy efficiency and to be more dynamic.

Other issue with the current deployment of network nodes is the use of batteries such as Valve Regulated Lead Acid (VRLA) batteries, which are used today as battery back-up for network nodes, for e.g. radio network nodes in GSM, WCDMA and LTE. The VRLA battery characteristics do not enable efficient operation of the power distribution system voltage, basically because the VRLA battery need to be set to a threshold e.g. −54.5 voltage direct current (VDC) to be able to keep the battery lifetime.

When the operator of the network node wants to add additional features such as adding 5G radios, the operator need to upgrade the architecture of the network node, power cabling and/or AC input fuse to be able to support the new added 5G radios. However, there is not enough power in a current infrastructure of network nodes to feed power for the feature such as 5G radio, see FIG. 1 showing structure for old sites.

Other deployment used by operators of network nodes is to use a direct current/direct current (DC/DC) booster, on the system voltage to increase the distribution voltage and gain in efficiency. But this approach comes with an added cost and a penalty in lowering the total mean time between failures (MTBF) of the network node, by adding power units on site decreasing the reliability of the network node and also introducing a single point of failure by adding a booster, FIG. 2.

SUMMARY

An object of embodiments herein is to provide a mechanism that improves operations of a network node in a communication network.

According to an aspect the object is achieved by providing a method performed by a network node for handling operation of the network node in a communication network. The network node comprises at least one power supply unit, and one or more additional power units for supplying power to the network node. The network node obtains an output from a computational model; and sets an output voltage from the at least one power supply unit based on the obtained output.

According to yet another aspect the object is achieved by providing a network node for handling operation of the network node in a communication network. The network node comprises at least one power supply unit, and one or more additional power units for supplying power to the network node. The network node is configured to obtain an output from a computational model; and set an output voltage from the at least one power supply unit based on the obtained output.

It is furthermore provided herein a computer program product comprising instructions, which, when executed on at least one processor, cause the at least one processor to carry out any of the methods above, as performed by the network node. It is additionally provided herein a computer-readable storage medium, having stored thereon a computer program product comprising instructions which, when executed on at least one processor, cause the at least one processor to carry out the method according to any of the methods above, as performed by the network node.

It is herein disclosed a network node for improving and increasing the total operating efficiency by setting output voltage based on output from the computational model. This enables increasing the system voltage to e.g. −57.5 VDC, by in advance control of e.g. deactivating the VRLA battery. The VRLA battery may be connected in time (before it is needed) by using the computational model such as a machine learning (ML) model, to predict when a power outage occurs, such as a power grid failure. One may also measure the power supply unit (PSU) AC input voltage to detect power outage and reconnect the VRLA battery.

The method may be applied, for operators e.g. in western countries, were the grid is stable and the use of VRLA battery are only in standby mode. The method can be initiated as a service, by making initial tuning, for radio and power. Only software (SW) changes may be needed for this function and no adding of hardware (HW) units is needed. Savings in distribution of energy going from output voltage from −54.5 to −57.5 VDC equals a saving of 5 A=10% improvement or a saving of 8 A=4.6% improvement. In embodiments herein there is no need to add an DC/DC booster that might increase the fail rate. Thus, embodiments herein improve operations of the network node in the communication network.

BRIEF DESCRIPTION OF THE DRAWINGS

Embodiments will now be described in more detail in relation to the enclosed drawings, in which:

FIGS. 13-16 are flowcharts illustrating methods implemented in a communication system including a host computer, a base station and a user equipment.

DETAILED DESCRIPTION

Embodiments herein may be described relating to a network node within the context of 3GPP NR radio technology (3GPP TS 38.300 V15.2.0 (2018-06)), e.g. using gNB as the radio network node. It is understood, that the problems and solutions described herein are equally applicable to wireless access networks and network nodes implementing other access technologies and standards. NR is used as an example technology where embodiments are suitable, and using NR in the description therefore is particularly useful for understanding the problem and solutions solving the problem. In particular, embodiments are applicable also to 3GPP LTE, or 3GPP LTE and NR integration, also denoted as non-standalone NR.

Figure 1:
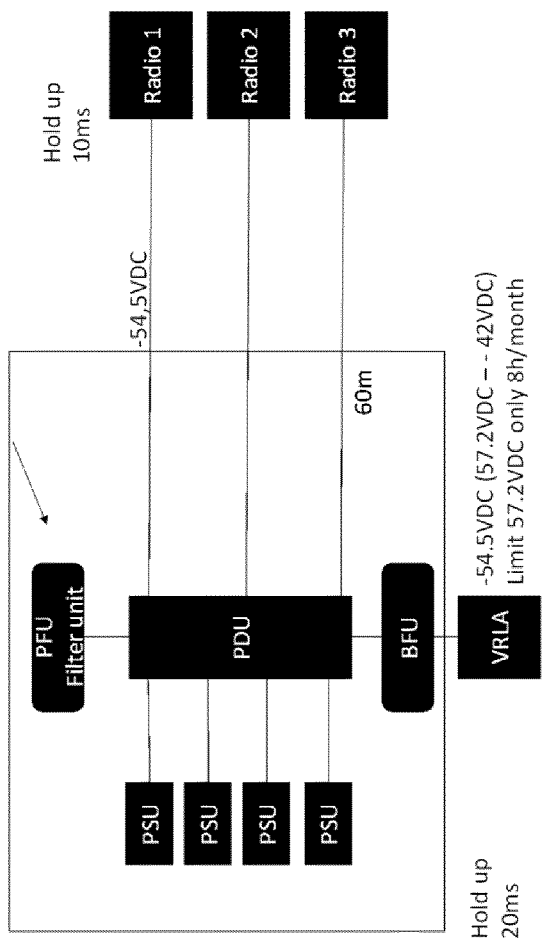
FIG. 1 is a schematic overview depicting a network node according to prior art.
Figure 2:
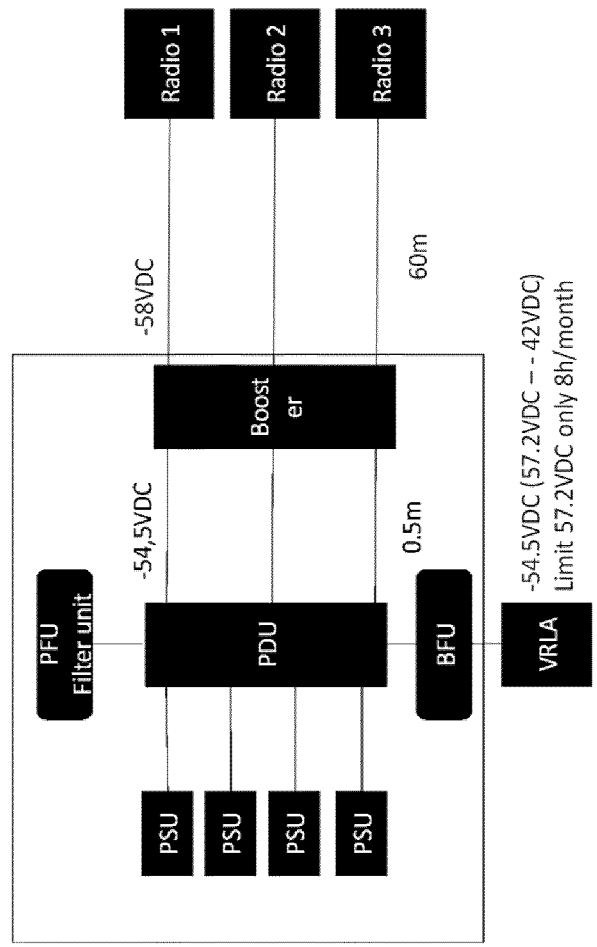
FIG. 2 is a schematic overview depicting a network node according to prior art.
Figure 3:
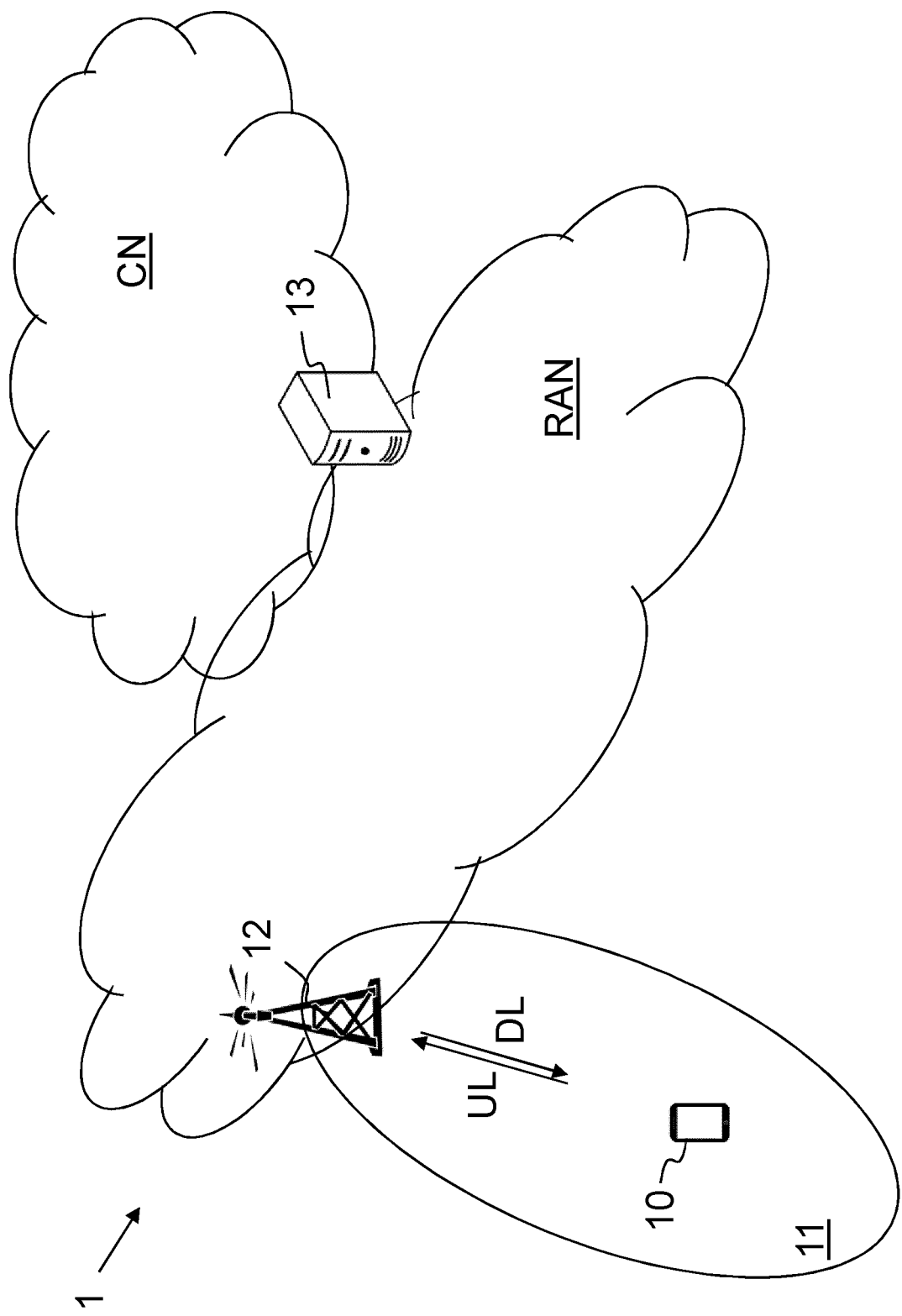
FIG. 3 is a schematic overview depicting a communication network according to embodiments herein.

Embodiments herein relate to communication networks in general. FIG. 3 is a schematic overview depicting a communication network 1. The communication network 1 comprises e.g. one or more RANs and one or more CNs. The communication network 1 may use one or a number of different technologies, such as Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Embodiments herein relate to recent technology trends that are of particular interest in 5G systems, however, embodiments are also applicable in further development of the existing communication systems such as e.g. a WCDMA and LTE.

In the communication network 1, wireless devices e.g. a UE 10 such as a mobile station, a non-access point (non-AP) station (STA), a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, IoT operable device, or node e.g. smart phone, laptop, mobile phone, sensor, relay, mobile tablets or even a small base station capable of communicating using radio communication with a network node within an area served by the network node.

The communication network 1 comprises a network node 12 providing e.g. radio coverage over a geographical area, a service area 11, of a radio access technology (RAT), such as NR, LTE, Wi-Fi, WiMAX or similar. The network node 12 may be a transmission and reception point, a computational server, a database, a server communicating with other servers, a server in a server park, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The network node 12 may alternatively or additionally be a controller node or a packet processing node such or similar. The network node 12 may be referred to as a serving network node wherein the service area 11 may be referred to as a serving cell or primary cell, and the serving network node communicates with the UE 10 in form of DL transmissions to the UE 10 and UL transmissions from the UE 10. The network node 12 may be a distributed node comprising a baseband unit and one or more remote radio units.

It should be noted that a service area may be denoted as cell, beam, beam group or similar to define an area of radio coverage.

According to embodiments herein radio units of the network node 12 may increase the total power consumption on the network node 12, when deployed on e.g. a current network node. To get energy efficiency improvements in the network node 12, the power losses in the power distribution infrastructure need to be reduced, and especially the current since $P=R*I^2$ wherein P is power, R is resistance and I is current.

The network node 12 comprises at least one power supply unit (PSU) e.g. connected to an electronic grid, and one or more additional power units (PU), such as removable power storages/energy storage, for supplying power to the network node 12. The additional power unit may comprise an VRLA battery such as the VRLA battery. The VRLA battery has a voltage operation between −57.5 VDC and −40.0 VDC where a nominal voltage of the VRLA battery is −54.5 VDC. The VRLA battery can only withstand −57.5 VDC for 8 h continuous operation, otherwise the VRLA battery will degrade and impact the battery lifetime.

According to embodiments herein the network node 12 obtains an output from a computational model such as a machine learning (ML) model, and sets an output voltage from the at least one power supply unit i.e. sets operational voltage, based on the obtained output. That is, from the output of the computational model the network node 12 may set the operational voltage of one or more PSUs e.g. to −57.5 VDC since the input voltage of PSU indicates e.g. no disturbance of the electronic grid. The computational model may thus provide an automatic dynamic control of one or more power supply units and may improve the network efficiency by introducing the automated dynamic control of the active PSUs. The network node 12 may additionally activate or not the additional PU through e.g. activating a battery switch such as a battery fuse unit (BFU) also using the output from the computational model as a central component of control logic of the network node 12. E.g. the control may be such that the additional PU e.g. VRLA battery, is disconnected when increasing the system voltage to −57.5 VDC, see FIG. 6.

The embodiments herein are based on control of two input parameters of probabilities of "not" having a disturbance nor a power outage on the grid or the AC voltage, that is, reliability of the power supplying the one or more PSUs, to set output voltage and determine whether to disconnect the additional PU or not. These two parameters may thus be ML sensing of PSU voltage alternating current (VAC) and ML predict model of power outages. If the probability of having power outage is high i.e. above a set threshold e.g. 25% likelihood, indicated by the output from the computational model, the additional PU be immediately reconnected.

Figure 4:
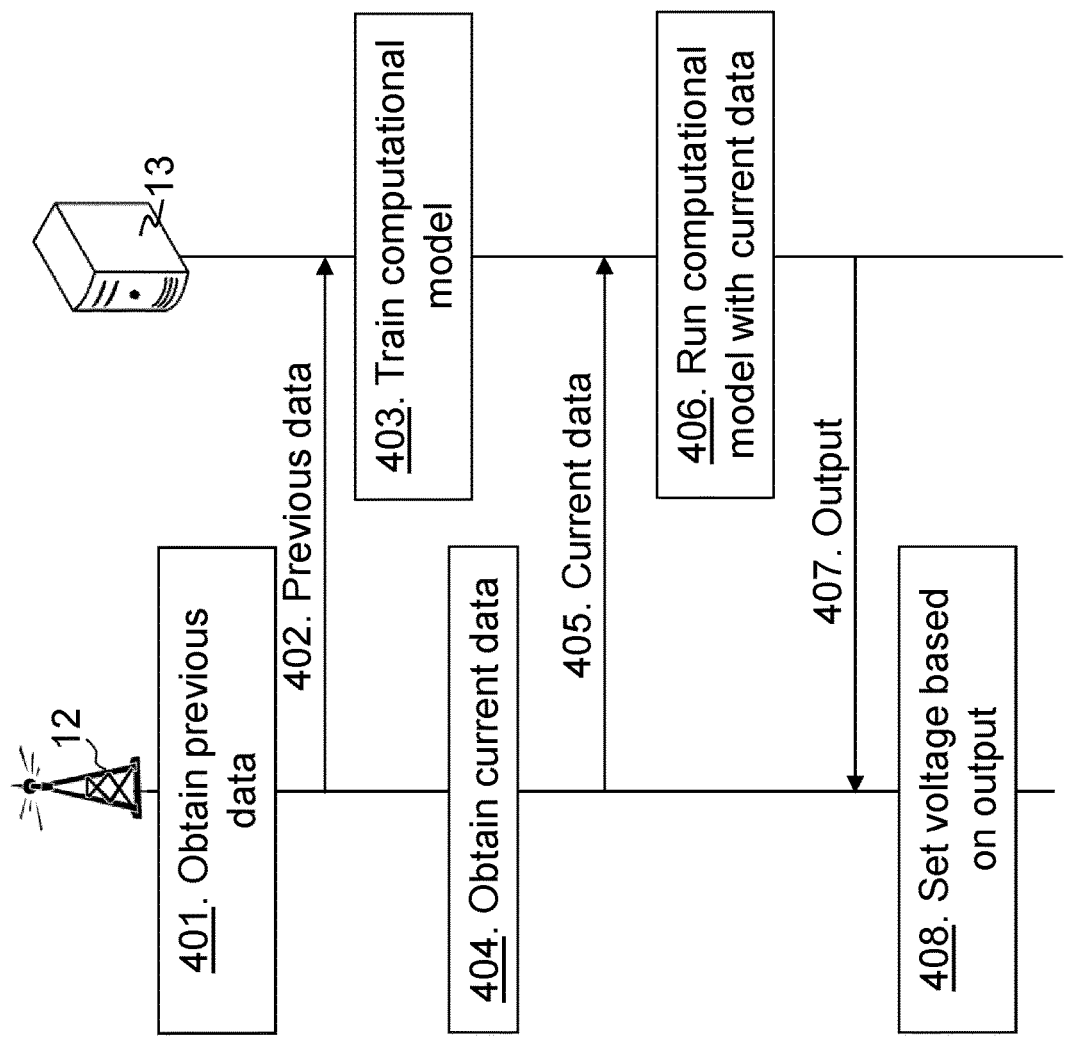
FIG. 4 is a combined signalling scheme and flowchart according to embodiments herein.

FIG. 4 is a schematic combined signalling scheme and flowchart depicting embodiments herein.

Action 401. The network node 12 or any network node collects data denoted as previous data to be fed to the computational model. Previous data may comprise operational status of power feed to the one or more PSUs.

Action 402. The network node 12 may then transmit the collected previous data to another network node or a server training the computational model.

Action 403. The other network node 13 may then train the computational model using the collected previous data.

Action 404. The network node 12 may further collect present data indicating a certain operational state. E.g. the present data may comprise PSU input voltage such as VAC, and/or output from an ML predict model of power outages.

Action 405. The network node 12 may transmit the collected current data to the other network node 13.

Action 406. The other network node 13 may then execute the computational model using received collected data as input into the computational model. From the computational model an output is generated. E.g. the output may indicate operational state of the power feed to the one or more PSUs.

Action 407. The other network node 13 may then transmit the output to the network node 12.

Action 408. The network node 12 then sets output voltage of the one or more active PSUs based on the received output. E.g. output indicates a stable power feed to the one or more PSUs and thus the network node 12 may set output voltage to a higher voltage since the additional PU may not be used or activated.

Figure 5:
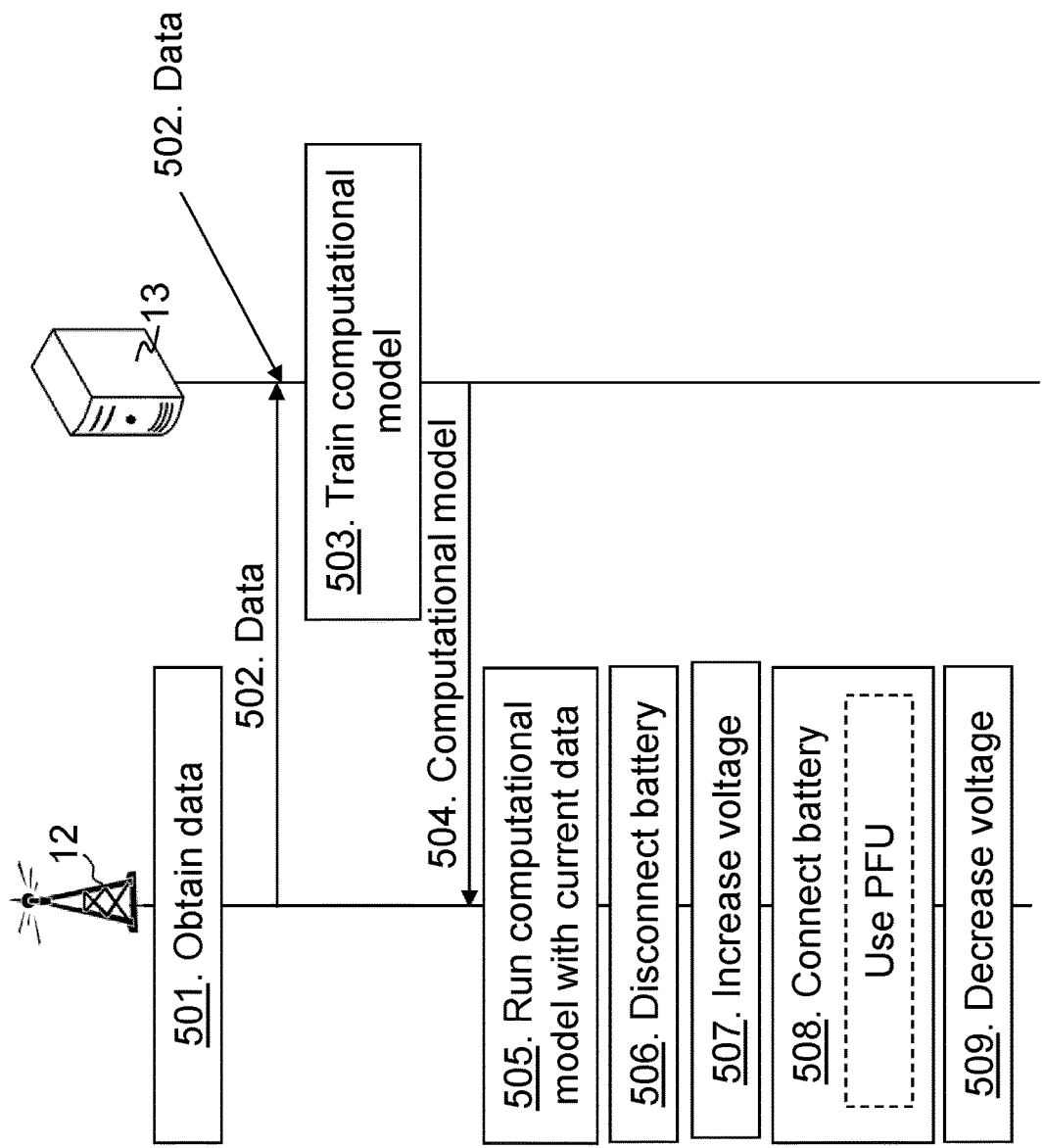
FIG. 5 is a combined signalling scheme and flowchart according to embodiments herein.

FIG. 5 is a schematic combined signalling scheme and flowchart depicting embodiments herein.

Action 501. The network node 12 or any network node may obtain or collect data to be fed to the computational model. The data may comprise operational status of power feed to the one or more PSUs.

Action 502. The network node 12 may then transmit the collected data to another network node or a server training the computational model. It should be noted that the data may be retrieved or obtained from one or more network nodes including or excluding the network node 12.

Action 503. The other network node 13 may then train the computational model using the collected data.

Action 504. The other network node 13 may then transmit the trained computational model or parts of it to the network node 12

Action 505. The network node 12 may then execute or run the computational model using current data as input into the computational model. E.g. the current data may comprise PSU input voltage such as VAC, and/or output from an ML predict model of power outages. From the computational model an output is generated. E.g. the output may indicate operational state of the power feed to the one or more PSUs such as a stable operational state or not.

Action 506. The network node 12 may then, based on the output, e.g. disconnect the additional PU such as the battery e.g. in case of stable operational state.

Action 507. The network node 12 may then increase output voltage of the one or more PSUs that is, increase operational voltage based on the output.

Action 508. Additionally, the network node 12 may then from an additional execution of the computational model and may, based on the additional output, connect the additional power unit. It should be noted that current power architecture of a network node also incorporates a power filter unit (PFU), which is a unit that collects or gets charged during operation so that the PFU may act as an intermediate backup and may be used during connection of the additional power unit since the PFU is supplying power to the radio unit(s) until the additional PU is connected.

Action 509. The network node 12 may further decrease the voltage to avoid damaging the additional power unit based on the additional output. Thus, the network node 12 may set the output voltage of the one or more PSUs to a different level such as reducing the output voltage. E.g. output indicates a power outage to the one or more PSUs and thus the network node 12 may set output voltage to a lower voltage since the additional PU may be used or activated.

As stated above the current power architecture of a network node may also incorporate a PFU acting as an intermediate backup, between switching intervals of the output voltage, thus, the power is stored during interval between non-activated battery. The stored voltage depends on the number of radio units installed for the network node 12 acting as a filter. Also, in the power architecture of a network node, a PSU may also include a hold up, that can also be used as intermediate back up acting as acts as a capacitive storage.

The computational model may be proposing to a local controller such as local processor, to adapt to proposed changes from the computational model and observations are generated incorporating different training sets (including the cloud).

Input to the computational model may be one or more of the following:

Power feed related data e.g. PSU AC voltage disturbance time tracking, half period 10 ms, which is continuously observed from the PSU, and may create a probability of failure number, e.g. all measurements that are made, and are <10 ms are seen and quantified as a disturbance in the computational model making the prediction.

A probability of "not" getting an outage and the network node 12 may use that information as input to control voltage setting, Note: the probability of e:g for a typical operator in western countries "not" having a power outage is almost 99.99%

The computational model may thus be used in the method to foresee the operational state of the network node 12, of AC voltage disturbance outage and power outage towards a fail, and based it on probability calculations.

There are some cases where the computational model may propose to reconnect the additional power unit for critical events e.g. wherein the additional power unit is a sealed lead acid (SLA) battery. These are e.g.:

a SLA based connection, wherein an important customer is in that cell.

an event based connection of battery.

in the event of high traffic demand e.g. above a threshold, the connection is adopted with a backup battery to reduce risk to disconnect the battery.

in critical machine type communication (MTC), the additional power unit may be connected to increase the reliability.

policy based connection.

Or when doing battery self-test.

Figure 6:
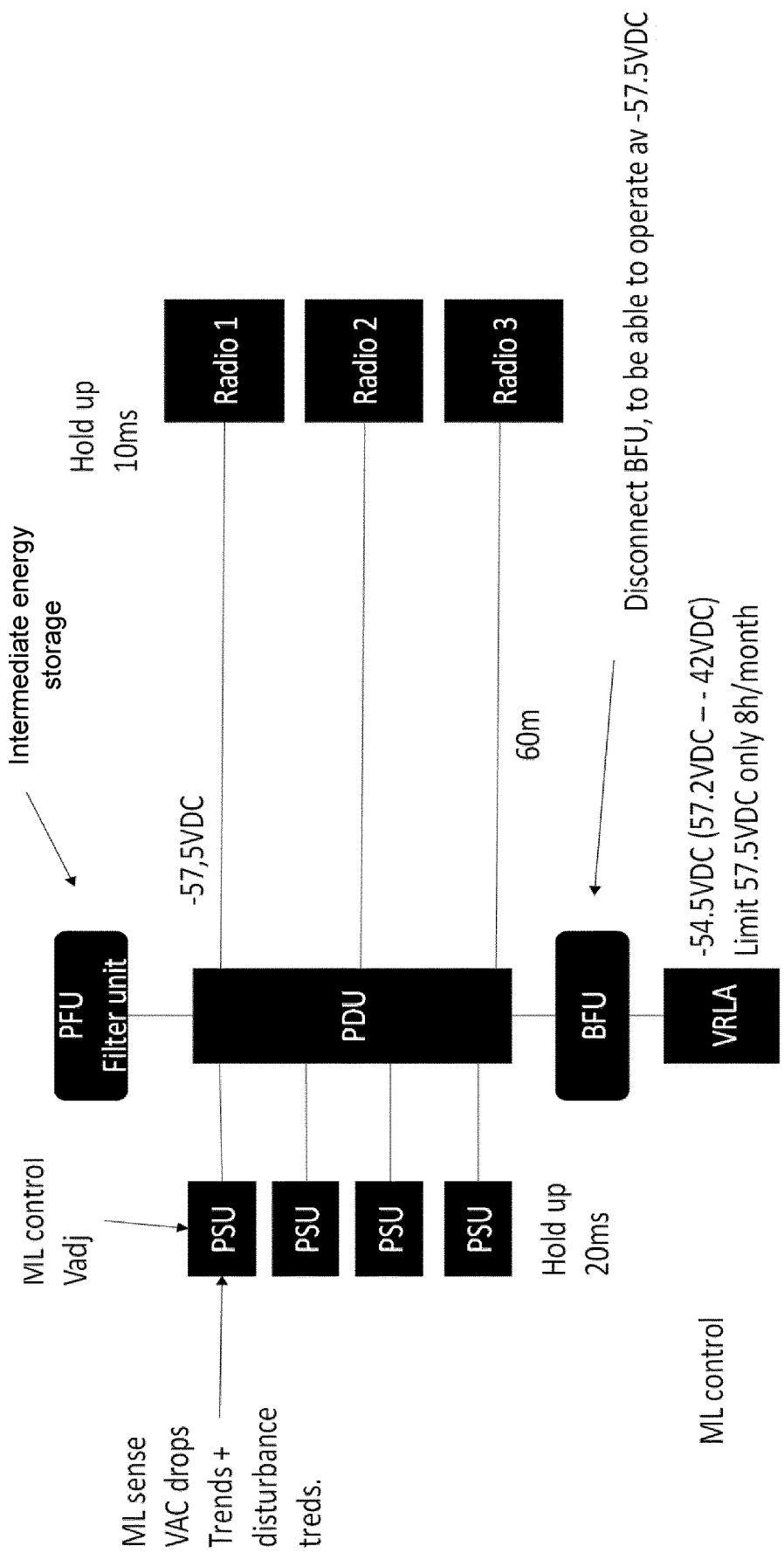
FIG. 6 is a block diagram depicting a network node according to embodiments herein.

FIG. 6 shows a block diagram depicting an arrangement of e.g. a baseband unit in the network node 12, connected via 60 meters cabling to remote radio units. The network node 12 may comprise a number of PSUs and e.g. a VRLA connected via a BFU to the PDU. The computational model such as a ML sense VAC drop trends and/or disturbance trends over the present running data. An ML control is used to predict how often battery is used. The ML control may adjust the voltage Vadj. The arrangement may further disconnect the battery e.g. BFU disconnected, upon stable operational voltage (voltage set to −57.5 VDC), and connect the battery upon non-stable operational state setting the output voltage to e.g. 54.5 VDC.

In the geographical regions where the power outages are frequent and usually follow a seasonal pattern, it is simpler to predict the power outage well in advance. However, in the regions where the power outages are very rare, training on a much longer timescale is required to capture patterns of readings from PSUs just before the power outage or in the events when the battery is used.

Additionally, the observations from cells in the region (town or locality) and contextual information can be used as input to decide if the battery should be connected or not.

Figure 7:
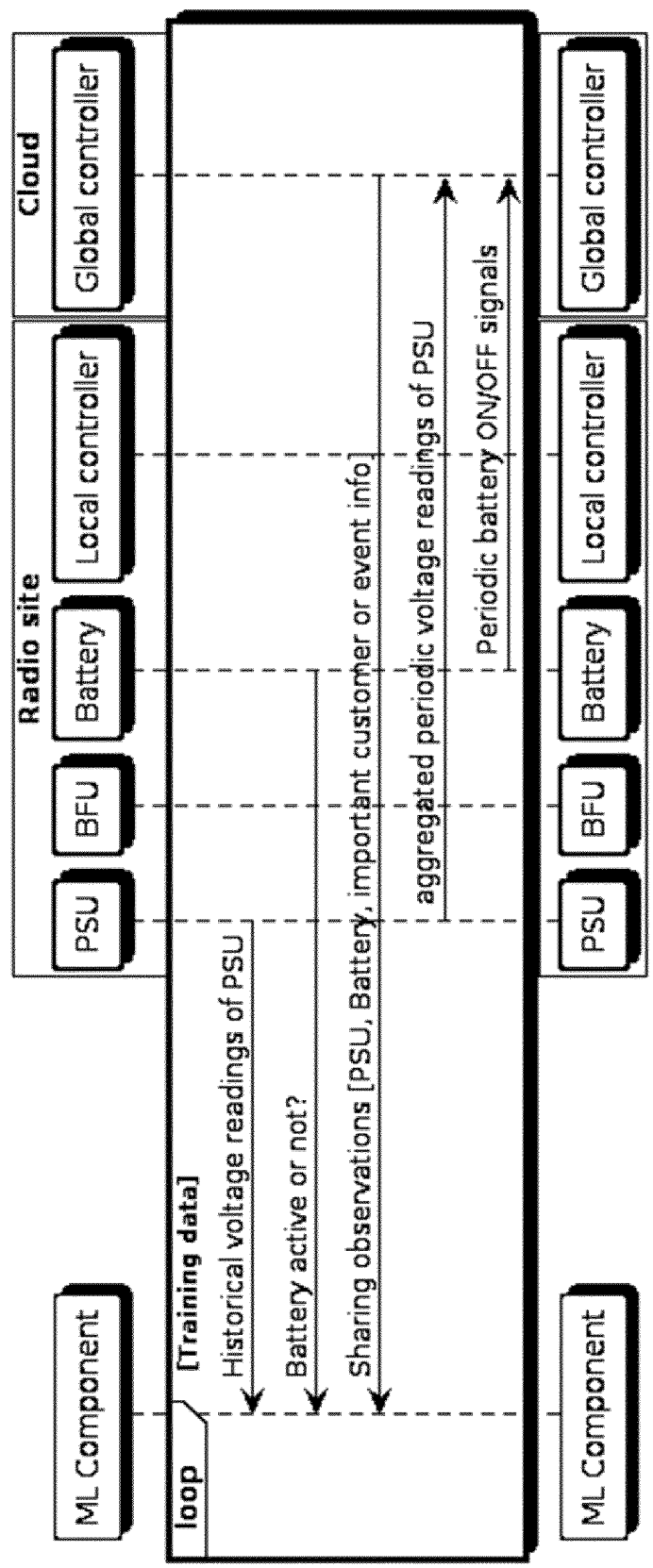
FIG. 7 is a signalling scheme according to embodiments herein.

The sequence diagram in FIG. 7 incorporates all the active participant network nodes that depicts a training process of the ML component. Inputs are historical voltage readings from PSU with timestamps, signal if the site is running on battery or AC power supply from the battery, and additional inputs, such as PSU, battery, important customer or event info, from global controller in cloud that sends observations from the neighboring sites at each timestamp. The PSU may transmit aggregated periodic voltage reading of PSU to the global controller and the battery may transmit periodic on/off signals to the global controller.

Figure 8:
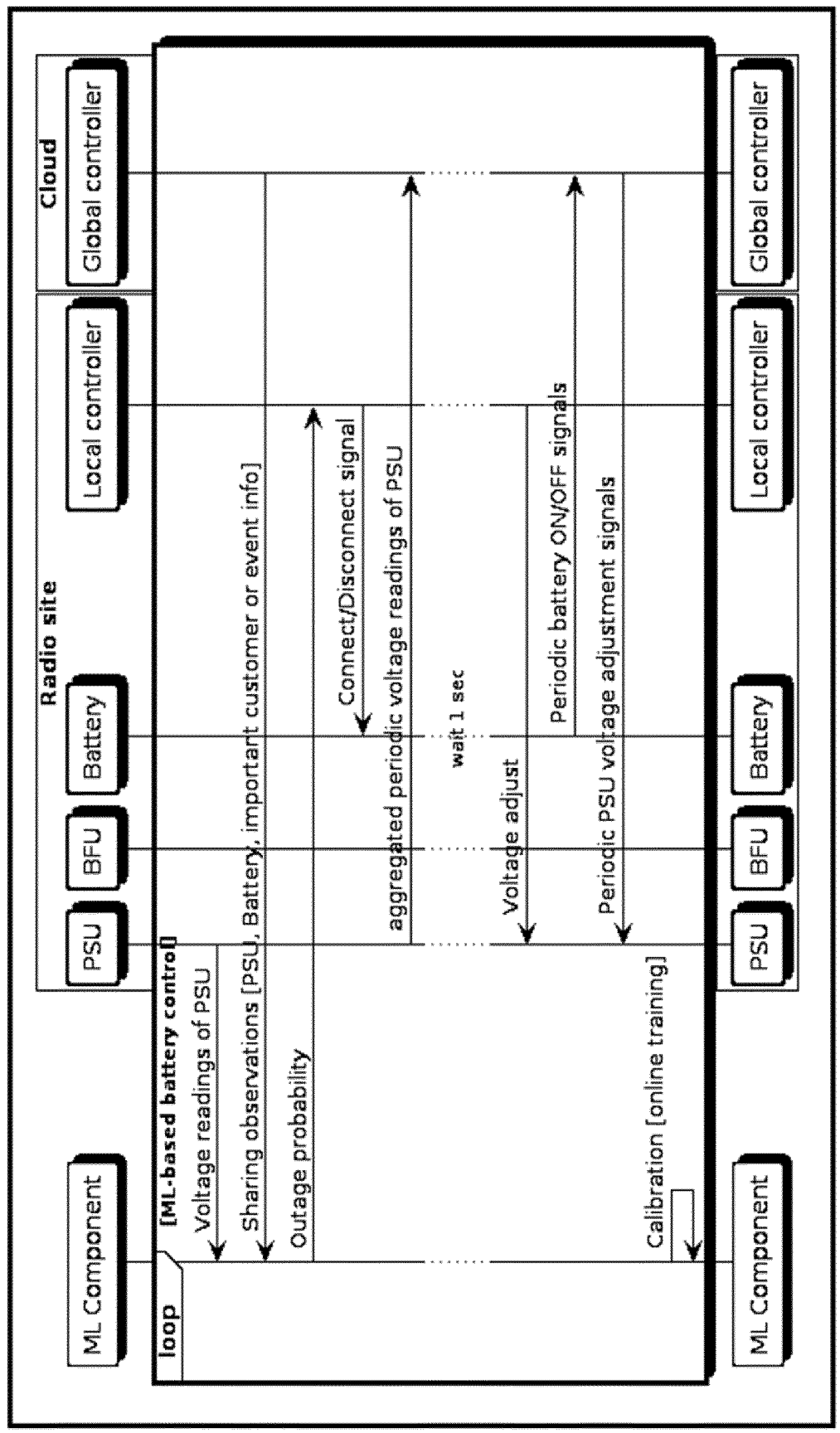
FIG. 8 is a signalling scheme according to embodiments herein.

Once the training process is completed with statistically significant number of training samples constituting of outages, as shown in FIG. 7, the local controller/base band is given the power to dynamically connect and disconnect battery based on outage prediction from ML component (See FIG. 8). The probability of outage and the context determines if Local Controller signals the battery "connect" or "disconnect" signal. The ML component with a feedback loop can retrain after every batch of data samples and specially after an outage.

Due to the presence of a Global controller, the sites may share their patterns with each other. For example, fluctuations of voltage in a neighboring site may signal a potential problem in the area. Similarly, global controller may explicitly signal with the help of a manual expert input to keep connected the battery due to an important event or highly critical service usage in the area.

PSU AC=input voltage sensing, for half sine period to reconnect battery

BFU=connect and disconnect when probability of outage is very low

PSU=When battery disconnected⇒increase system voltage to −57.5 VDC, from −54.5 VDC Cloud: may be use for training data set The computational model may comprise the following actions:

1. The computational model may calculate probability of not having a power outage, i.e. a stable grid
2. The computational model may further continue observing and tracking of AC voltage at the input of the network node
3. The computational model may further calculate by observing PSU AC voltage disturbance, for half sine wave disconnections, e.g. 10 ms.
4. The computational model may further calculate to "not" having a power disturbance probability and power outage probability.
5. Automatic connect and reconnect battery based on the power disturbance probability and/or power outage probability, and AC voltage tracking input.
6. The computational model may further make a distributed training set in cloud network of disturbance and control of BFU and PSU voltage.
7. The computational model may further connect automatic the battery in "priority" conditions i.e. the condition may be based on one or more of the following:
   a) SLA based connection (important customer in that cell).
   b) Event based connection of battery (e.g predicted incoming storms).
   c) Traffic demand, connection (don't risk to disconnect the battery.)
   d) In critical MTC, we connect the battery to increase the reliability.
   e) Policy based connection.
   f) Or when doing battery self-test.

Figure 9:
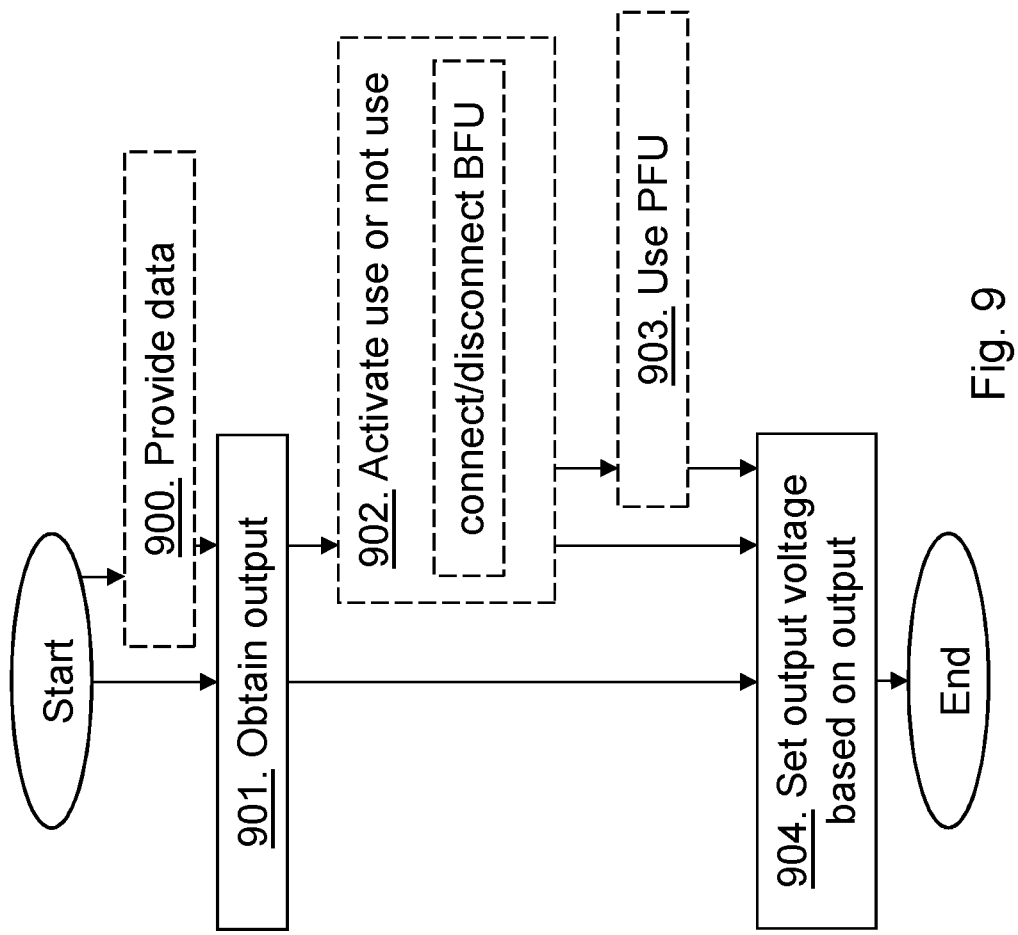
FIG. 9 is a schematic flowchart depicting a method performed by a network node according to embodiments herein.

The method actions performed by the network node 12 for handling operation, e.g. selecting output voltage from one or more PSUs, in a communication network according to embodiments will now be described with reference to a flowchart depicted in FIG. 9. The actions do not have to be taken in the order stated below, but may be taken in any suitable order. Actions performed in some embodiments are marked with dashed boxes. As stated above the network node 12 comprises at least one power supply unit, and one or more additional power units for supplying power to the network node 12 e.g. supplying power to radio units connected to the network node 12. The one or more additional power units may comprise one or more chargeable units, energy storages, and/or batteries. It should be noted that the network node may be a distributed radio network node comprising at least one remote radio unit and one baseband unit co-located with the at least one power supply unit, and the one or more additional power units. The network node may be a base station, an access node, a server, or a communication node.

Action 900. The network node 12 may provide data, internally or externally, of the network node 12 to train the computational model. The data may comprise an indication of one or more power failures, one or more set voltages, condition of the one or more additional power units, and an indication of usage of the one or more additional power units upon the one or more set voltages. The computational model may be trained at the network node 12 or at another network node 13. The computational model may be a machine learning model such as a neural network or similar.

Action 901. The network node 12 obtains the output from the computational model.

Action 902. The network node 12 may activate use or not use of the one or more additional power units/energy storage based on the set voltage e.g. turning ON/OFF of the BFU unit, connected to one or more VRLA batteries. The network node 12 may activate use or not use by connecting or disconnecting a fuse unit connected to the one or more additional power units also based on the obtained output of the computational model.

Action 903. The network node 12 may, upon activating use of the one or more additional power units, use the power filter unit to supply power until the one or more additional power units is connected to supply power e.g. a set time interval. The network node 12 may be a radio network node and the power filter unit may be an intermediate backup for bridging the power to one or more radios of the radio network node.

Action 904. The network node 12 further sets the output voltage from the at least one power supply based on the obtained output. E.g. when the obtained output of the computational model indicates a stable power grid to the at least one power supply unit, the network node 12 may set the output voltage by increasing the output voltage above a threshold e.g. set the output voltage to −57.5 VDC; and deactivating the one or more additional power units e.g. disconnecting an VRLA battery e.g. dynamically.

Figure 10:
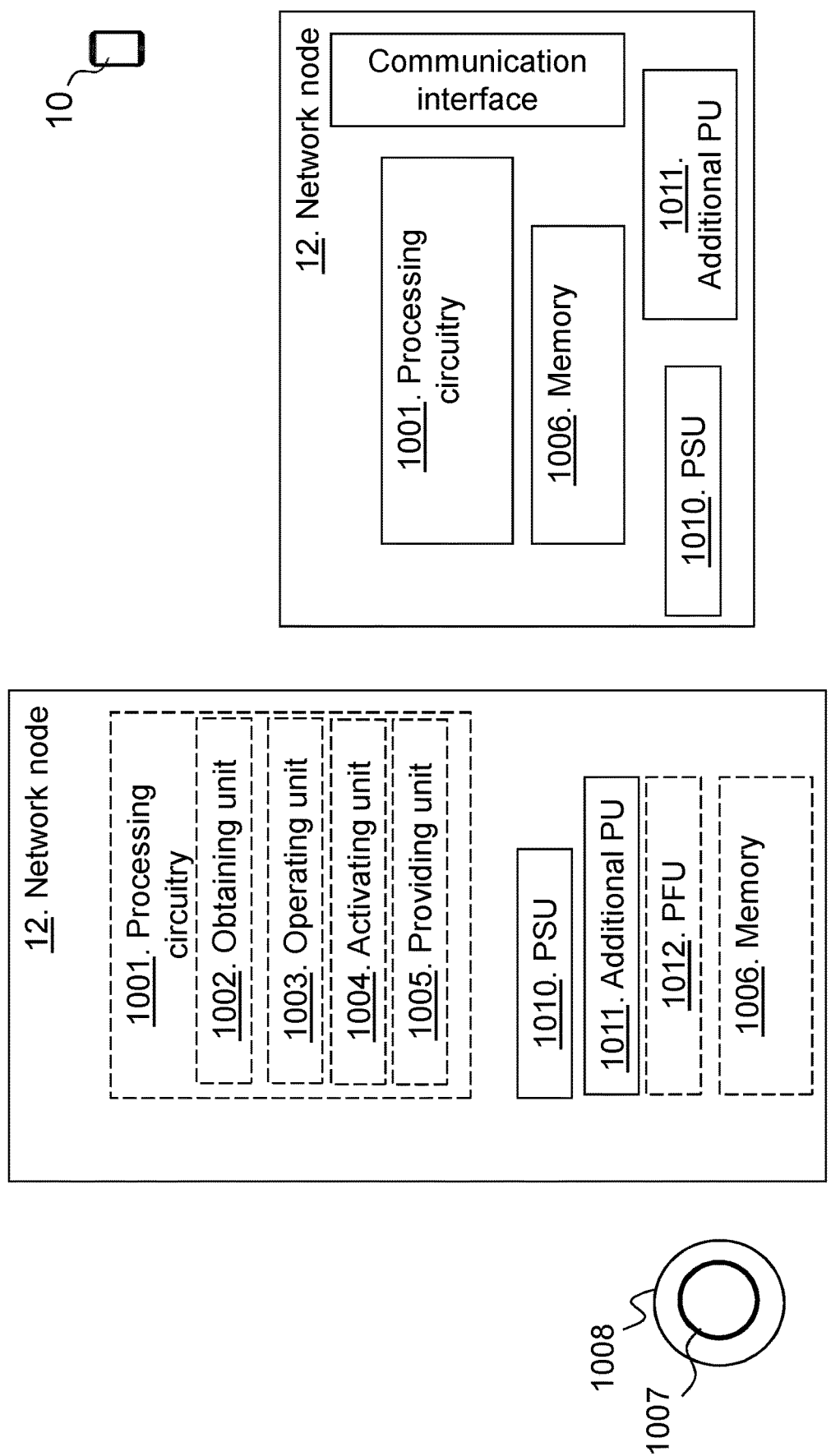
FIG. 10 is a block diagram depicting a network node according to embodiments herein.

FIG. 10 is a block diagram depicting the network node 12 for handling operation e.g. setting operational voltage, in the communication network. The network node comprises at least one power supply unit 1010, and one or more additional power/energy storage units 1011 for supplying power to the network node 12 according to embodiments herein.

The network node 12 may comprise processing circuitry 1001, e.g. one or more processors, configured to perform the methods herein.

The network node 12 may comprise an obtaining unit 1002, e.g. a receiver or a transceiver. The network node 12, the processing circuitry 1001 and/or the obtaining unit 1002 is configured to obtain the output from the computational model.

The network node 12 may comprise an operating unit 1003. The network node 12, the processing circuitry 1001 and/or the operating unit 1003 is configured to set the output voltage from the at least one power supply unit 1010 based on the obtained output. E.g. when the obtained output of the computational model indicates a stable power grid to the at least one power supply unit 1010, the network node 12, the processing circuitry 1001 and/or the operating unit 1003 may be configured to set the output voltage by: increasing the output voltage above a threshold; and deactivating the one or more additional power units/energy storage 1011 e.g. dynamically.

The network node 12 may comprise an activating unit 1004 e.g. a fuse unit. The network node 12, the processing circuitry 1001 and/or the activating unit 1004 may be configured to activate use or not use of the one or more additional power units 1011 based on the set voltage such as turning ON/OFF of the BFU unit, connected to VRLA batteries. The network node 12, the processing circuitry 1001 and/or the activating unit 1004 may be configured to, upon activating use of the one or more additional power units 1011, use a power filter unit (PFU) 1012 to supply power until the one or more additional power units is connected to supply power. The network node may e.g. be a radio network node and the power filter unit may then be an intermediate backup for bridging the power to one or more radios of the radio network node. The network node 12, the processing circuitry 1001 and/or the activating unit 1004 may be configured to activate use or not use by connecting or disconnecting the fuse unit 1012 connected to the one or more additional power units 1011, also based on the obtained output of the computational model. The one or more additional power units 1011 may comprise one or more chargeable units, energy storages, and/or batteries.

The network node 12 may comprise a providing unit 1005, e.g. a transmitter or a transceiver. The network node 12, the processing circuitry 1001 and/or the providing unit 1005 may be configured to provide data of the network node 12 to train the computational model. The data may comprise an indication of one or more power failures, one or more set voltages, a condition of the one or more additional power units, and an indication of usage of the one or more additional power units upon the one or more set voltages. The computational model may be trained at the network node 12 or at another network node 13.

The network node may be a distributed radio network node comprising at least one remote radio unit and one baseband unit co-located with the at least one power supply unit 1010, and the one or more additional power units 1011.

The computational model may be a machine learning model such as a neural network or computational tree model.

The network node may be a base station, an access node, a server, or a communication node.

The network node 12 further comprises a memory 1006. The memory comprises one or more units to be used to store data on, such as output voltages, power outages, operational data, applications to perform the methods disclosed herein when being executed, and similar. The network node 12 comprises a communication interface comprising e.g. one or more antennas.

The methods according to the embodiments described herein for the network node 12 are respectively implemented by means of e.g. a computer program product 1007 or a computer program, comprising instructions, i.e., software code portions, which, when executed on at least one processor, cause the at least one processor to carry out the actions described herein, as performed by the network node 12. The computer program product 1007 may be stored on a computer-readable storage medium 1008, e.g. a universal serial bus (USB) stick, a disc or similar. The computer-readable storage medium 1008, having stored thereon the computer program product, may comprise the instructions which, when executed on at least one processor, cause the at least one processor to carry out the actions described herein, as performed by the network node 12. In some embodiments, the computer-readable storage medium may be a non-transitory or a transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 11:
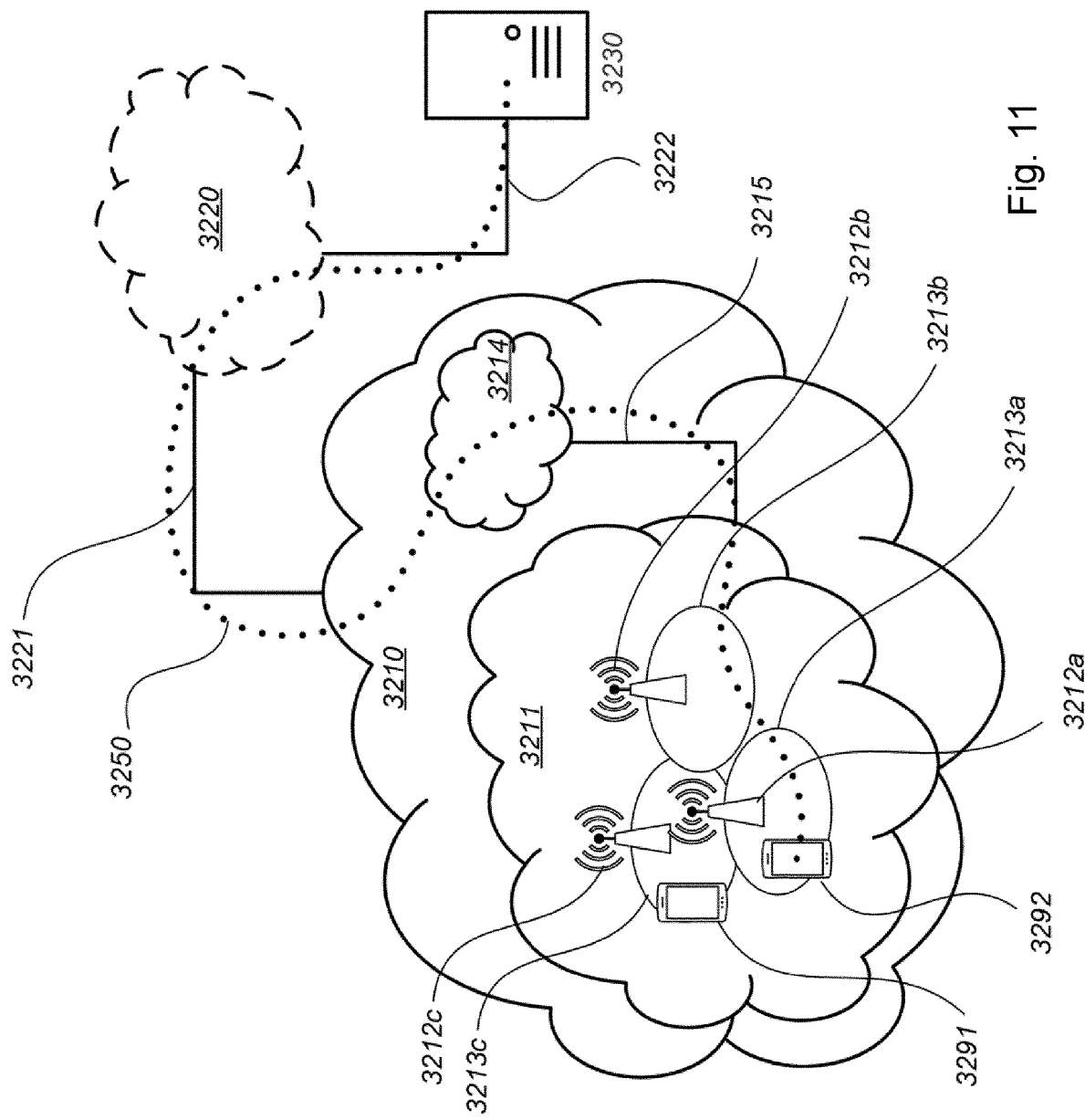
FIG. 11 schematically illustrates a telecommunication network connected via an intermediate network to a host computer.

With reference to FIG. 11, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
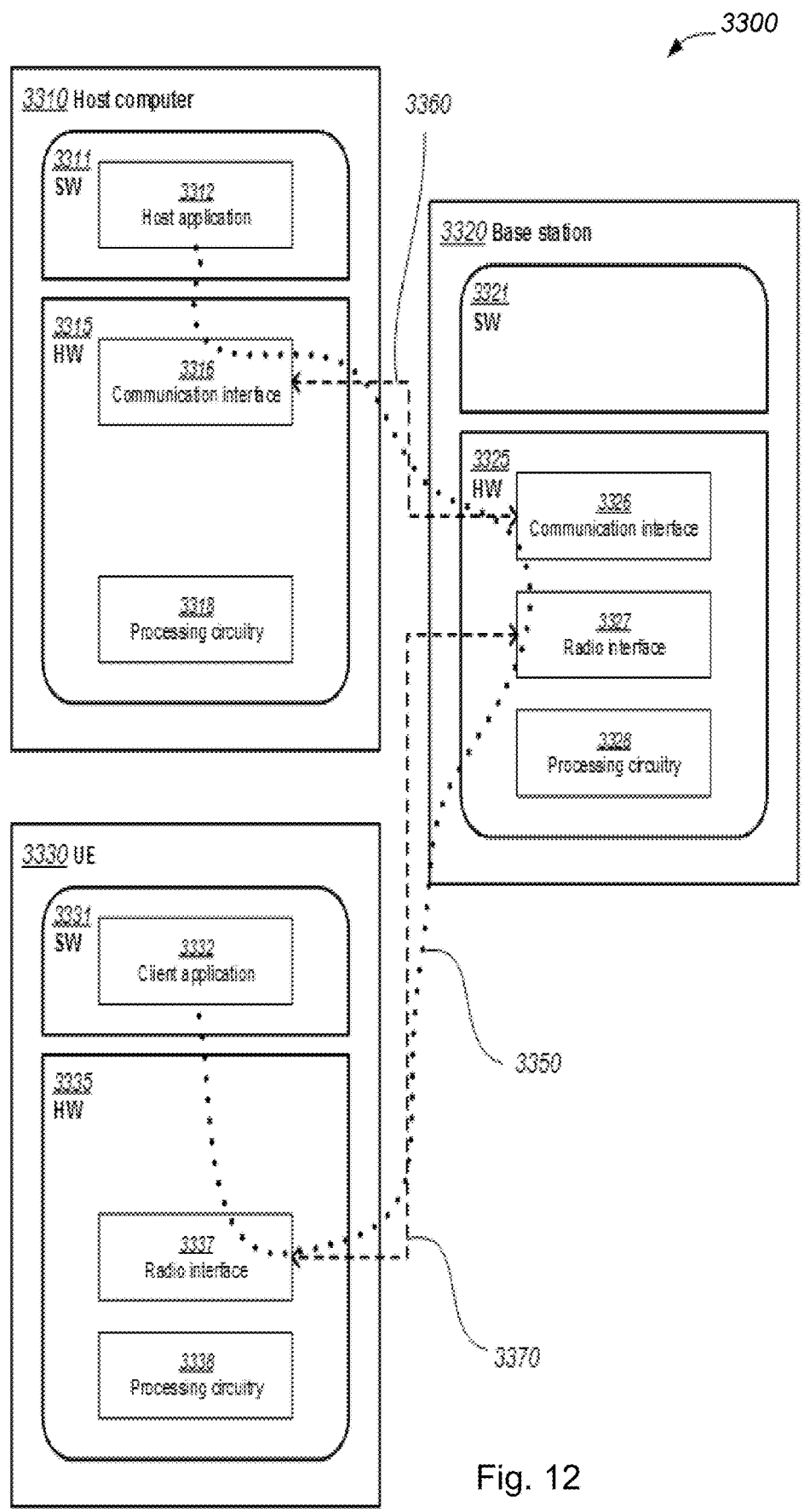
FIG. 12 is a generalized block diagram of a host computer communicating via a base station with a user equipment over a partially wireless connection.

It is noted that the host computer 3310, base station 3320 and UE 3330 illustrated in FIG. 12 may be identical to the host computer 3230, one of the base stations 3212a, 3212b, 3212c and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the operational voltage to enhance performance of the network node and thereby provide benefits such as improved battery time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Abbreviations

A Ampere
AC Alternating Current
BFU Battery Fuse Unit
CAPEX Capital Expenditure

CMTC Critical Machine Type Communication
DC/DC Direct Current Converter
I Current
ML Machine Learning
OPEX Operating Expenditure
P Power
PFU Power Filter Unit
PDU Power Distribution Unit
PM Performance manager
PSU Power Supply Unit
R Resistance
TCO Total Cost of Ownership
VDC Voltage Direct Current
VRLA Valve Regulated Lead Acid

The invention claimed is:

1. A method performed by a network node for handling operation of the network node in a communication network, wherein the network node comprises at least one power supply unit, and one or more additional power units for supplying power to the network node, the method comprising
obtaining an output from a computational model; and
setting an output voltage from the at least one power supply unit based on the obtained output, wherein setting the output voltage comprises increasing the output voltage above a threshold.

2. The method according to claim 1, further comprising activating use or not use of the one or more additional power units based on the set voltage.

3. The method according to claim 2, further comprising, upon activating use of the one or more additional power units, using a power filter unit to supply power until the one or more additional power units is connected to supply power.

4. The method according to claim 3, wherein the network node is a radio network node and the power filter unit is an intermediate backup for bridging the power to one or more radios of the radio network node.

5. The method according to claim 2, wherein activating use or not use comprises connecting or disconnecting a fuse unit connected to the one or more additional power units is also based on the obtained output of the computational model.

6. The method according to claim 1, further comprising:
providing data of the network node to train the computational model.

7. The method according to claim 6, wherein data comprises an indication of one or more power failures, one or more set voltages, condition of the one or more additional power units, and an indication of usage of the one or more additional power units upon the one or more set voltages.

8. The method according to claim 6, wherein the computational model is trained at the network node or at another network node.

9. The method according to claim 1, wherein the computational model is a machine learning model.

10. The method according to claim 1, wherein the obtained output of the computational model indicates a stable power grid to the at least one power supply unit and then setting the output voltage comprises: deactivating the one or more additional power units.

11. A network node for handling operation of the network node in a communication network, wherein the network node comprises at least one power supply unit, and one or more additional power units for supplying power to the network node, and wherein the network node is configured to:
obtain an output from a computational model; and
set an output voltage from the at least one power supply unit based on the obtained output, wherein setting the output voltage comprises increasing the output voltage above a threshold.

12. The network node according to claim 11, wherein the network node is further configured to:
activate use or not use of the one or more additional power units based on the set voltage.

13. The network node according to claim 12, wherein the network node is configured to, upon activating use of the one or more additional power units, use a power filter unit to supply power until the one or more additional power units is connected to supply power.

14. The network node according to claim 13, wherein the network node is a radio network node and the power filter unit is an intermediate backup for bridging the power to one or more radios of the radio network node.

15. The network node according to claim 11, wherein the network node is configured to activate use or not use by connecting or disconnecting a fuse unit connected to the one or more additional power units, also based on the obtained output of the computational model.

16. The network node according to claim 11, wherein the network node is further configured to provide data of the network node to train the computational model.

17. The network node according to claim 11, wherein the one or more additional power units comprise one or more chargeable units, energy storages, batteries, or power storages.

18. The network node according to claim 11, wherein the network node is a distributed radio network node comprising at least one remote radio unit and one baseband unit co-located with the at least one power supply unit, and the one or more additional power units.

19. The network node according to claim 11, wherein the network node is a base station, an access node, a server, or a communication node.

20. A computer program product comprising a non-transitory computer readable medium storing instructions, which, when executed on at least one processor, cause the at least one processor to carry out a method for handling operation of a network node in a communication network, wherein the network node comprises at least one power supply unit, and one or more additional power units for supplying power to the network node, the method comprising:
obtaining an output from a computational model; and
setting an output voltage from the at least one power supply unit based on the obtained output, wherein setting the output voltage comprises increasing the output voltage above a threshold.

* * * * *